United States Patent [19]

King et al.

[11] Patent Number: 5,710,699
[45] Date of Patent: Jan. 20, 1998

[54] POWER ELECTRONIC INTERFACE CIRCUITS FOR BATTERIES AND ULTRACAPACITORS IN ELECTRIC VEHICLES AND BATTERY STORAGE SYSTEMS

[75] Inventors: Robert Dean King, Schenectady, N.Y.; Rik Wivina Anna Adelson DeDoncker, Malvern, Pa.

[73] Assignee: General Electric Company, Schenectady, N.Y.

[21] Appl. No.: 654,479

[22] Filed: May 28, 1996

[51] Int. Cl.[6] .................................... H02M 7/5387
[52] U.S. Cl. ...................... 363/132; 323/271; 318/139
[58] Field of Search .............................. 363/50, 65, 55, 363/56, 95, 97, 93, 123, 124, 131, 132; 323/271; 318/139, 375, 376

[56] References Cited

U.S. PATENT DOCUMENTS

| | | | |
|---|---|---|---|
| 4,904,918 | 2/1990 | Bailey et al. | 318/762 |
| 5,047,913 | 9/1991 | DeDoncker et al. | 363/95 |
| 5,170,105 | 12/1992 | Kumar | 318/362 |
| 5,373,195 | 12/1994 | DeDoncker et al. | 363/98 X |
| 5,552,681 | 9/1996 | Suzuki et al. | 318/139 |

OTHER PUBLICATIONS

Design Methodologies For Soft Switched Inverters; D.M. Divan, G. Venkataramanan, R.W. DeDoncker; 1988 IEEE; pp. 758–766.

*Primary Examiner*—Peter S. Wong
*Assistant Examiner*—Y. J. Han
*Attorney, Agent, or Firm*—Marvin Snyder

[57] ABSTRACT

A method and apparatus for load leveling of a battery in an electrical power system includes a power regulator coupled to transfer power between a load and a DC link, a battery coupled to the DC link through a first DC-to-DC converter and an auxiliary passive energy storage device coupled to the DC link through a second DC-to-DC converter. The battery is coupled to the passive energy storage device through a unidirectional conducting device whereby the battery can supply power to the DC link through each of the first and second converters when battery voltage exceeds voltage on the passive storage device. When the load comprises a motor capable of operating in a regenerative mode, the converters are adapted for transferring power to the battery and passive storage device. In this form, resistance can be coupled in circuit with the second DC-to-DC converter to dissipate excess regenerative power.

15 Claims, 7 Drawing Sheets

POWER ELECTRONIC INTERFACE CIRCUITS FOR BATTERIES AND ULTRACAPACITORS IN ELECTRIC VEHICLES AND BATTERY STORAGE SYSTEMS

The U.S. Government has a paid-up license in this invention and the right in limited circumstances to require the patent owner to license others on reasonable terms as provided for by the terms of Contract No.: DEAC07-76-ID01570 awarded by the U.S. Department of Energy.

BACKGROUND OF THE INVENTION

This invention relates to battery electric power systems and, more particularly, to pulsed load systems such as battery powered drive systems used in battery powered electric vehicles.

Pulsed load systems such as electric vehicle systems currently in use and in development utilize rechargeable batteries, typically lead-acid batteries, to provide electric power. In a vehicle propulsion system, the batteries are connected to a direct current (DC) link which connects to a power control circuit such as a pulse width modulation (PWM) circuit for controlling power to a DC motor or to a frequency controlled inverter for controlling power to an alternating current (AC) motor. The motor, either AC or DC, is coupled in driving relationship to one or more wheels of the vehicle, either in a direct drive arrangement or through an appropriate transmission. Some vehicles are hybrids and include small internal combustion engines which can be used to supplement battery power.

In the operation of an electric vehicle, the battery is often called upon to deliver short bursts of power at high current levels, typically during acceleration of the vehicle. When high current is drawn from conventional batteries, battery terminal voltage drops. Such voltage reduction can interfere with proper operation or reduce efficiency of the switching devices in the power control circuit since the control circuit must be designed to operate at high efficiency at full battery voltage, i.e., when the vehicle is drawing nominal current in a constant speed mode.

One method for reducing the effect of high current requirements on electric drive system batteries is to use an auxiliary passive energy storage device coupled to the DC link such that the device can provide additional power during high current situations. One implementation of this method is shown in U.S. Pat. No. 5,373,195 issued Dec. 13, 1994 and assigned to General Electric Co., the disclosure of which is hereby incorporated by reference. This prior patent describes an auxiliary passive energy storage device which may comprise an ultracapacitor or a magnetic energy storage device and which can be coupled to the DC link voltage by an interface circuit. The interface circuit is a separate DC-to-DC converter having its own control with current feedback, gate drive and protection functions. The energy storage device can be charged either by regenerative braking or from the propulsion battery. In the system disclosed in the patent, the circuit optimizes the energy extracted from the storage device by requiring that the device be de-coupled from the battery and possibly from the DC link. This system requires a power electronics interface and control for each of the battery and the auxiliary energy storage device and further requires that the battery interface circuit be rated for full system power and that the auxiliary device interface circuit be rated for about ⅔ of system power. As a result, the power rating for the interface circuits exceeds the power capacity of the drive system, thus increasing system size and cost.

SUMMARY OF THE INVENTION

Among the objects of the present invention may be noted the provision of a motor power system which overcomes the above and other disadvantages of the prior art, and the provision of a battery load leveling system including a passive energy storage device that utilizes a respective converter with each of the battery and storage device so as to maintain the total converter power requirement at a one per unit basis. In an illustrative embodiment, battery loading in a battery load leveling arrangement for an electrically powered system is subject to intermittent high current loading such as may be occasioned by supply of electrical power to electric traction motors in an electrically powered vehicle. The system includes a battery for supplying electric power to a DC link through a first DC-to-DC converter and an auxiliary storage device such as an ultracapacitor bank also coupled to the DC link through a second DC-to-DC converter. The DC link may be coupled through an inverter to a three-phase electric traction motor. If the power handling capacity of the inverter is considered to be the base power for the system, it is desirable to conserve weight, size and cost of the interface converters by reducing their power handling capabilities to a total equal to the power handling capability of the inverter, i.e., to a one per unit base. To this end, the ultracapacitor bank is operated at a voltage substantially higher than the battery voltage during normal load leveling cycles, allowing the converter for the ultracapacitor bank to be designed at a two-thirds per unit power while the converter for the battery is designed for a one-third per unit power. During periods in which the motor is operated at maximum power, such as may occur during long hill climbs, the energy from the ultracapacitor bank may be depleted, thereby dropping its voltage to a level slightly below the battery voltage. A power diode coupling the battery to the ultracapacitor bank effectively couples the converter for the battery in parallel with the converter for the ultracapacitor bank when the ultracapacitor voltage is below the battery voltage level. With this arrangement, both converters may be operated in parallel to allow battery power to be supplied to the DC link on a one per unit basis.

When the electric motor is operated in a regenerative braking mode, power is generated by the motor and returned to the battery and the ultracapacitor bank. If regenerative braking occurs for a long period of time, the ultracapacitor bank and the battery may become fully charged and incapable of accepting additional energy from the motor. Accordingly, a dynamic braking circuit is coupled to the interface converter associated with the ultracapacitor bank. In one form, the dynamic braking circuit may comprise a braking resistance or braking grid serially connected with an electronic switching device coupled across the DC link. In a more cost effective embodiment, the dynamic braking circuit utilizes a thyristor or silicon controlled rectifier (SCR) as a switching device and is coupled to the converter circuit in a manner such that the switching devices in the converter circuit can be utilized to gate the thyristor out of conduction. In still another form, the second converter associated with the ultracapacitor bank is divided into two identical DC-to-DC converters coupled in parallel. The dynamic braking circuit is then coupled between the two converters in a manner that allows the timing of operation of the two converters to be staggered to force a voltage difference across the dynamic braking circuit in a manner that controls braking current through the circuit. This latter embodiment has the further advantage that each of the converter circuits, including the interface converter circuit between the battery and DC link, can be identical or modular and rated at one-third per unit power. Furthermore, the braking circuit can include a pair of reverse parallel coupled thyristors for regulating current through the dynamic braking circuit. Thyristors are less expensive than bidirectional electronic switching devices and can be gated out of conduction by gating one of the switching devices in the converter circuit so as to connect the anode terminals of the thyristors to the negative terminal of the DC link.

An alternative form of the invention utilizes a separate dynamic braking circuit coupled between the converter for the ultracapacitor bank and the positive terminal of the battery. In this circuit arrangement, once the ultracapacitor bank has been fully charged, additional power can be supplied to the battery through the dynamic braking circuit and the converter for the ultracapacitor bank. The additional dynamic braking circuit allows power to be dissipated in the braking resistance while providing boost charging to the battery, i.e., the power from the DC link to the battery can be at a higher level than would normally be available by using only the converter circuit associated with the battery.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) in which:

DETAILED DESCRIPTION OF THE INVENTION

Figure 1:
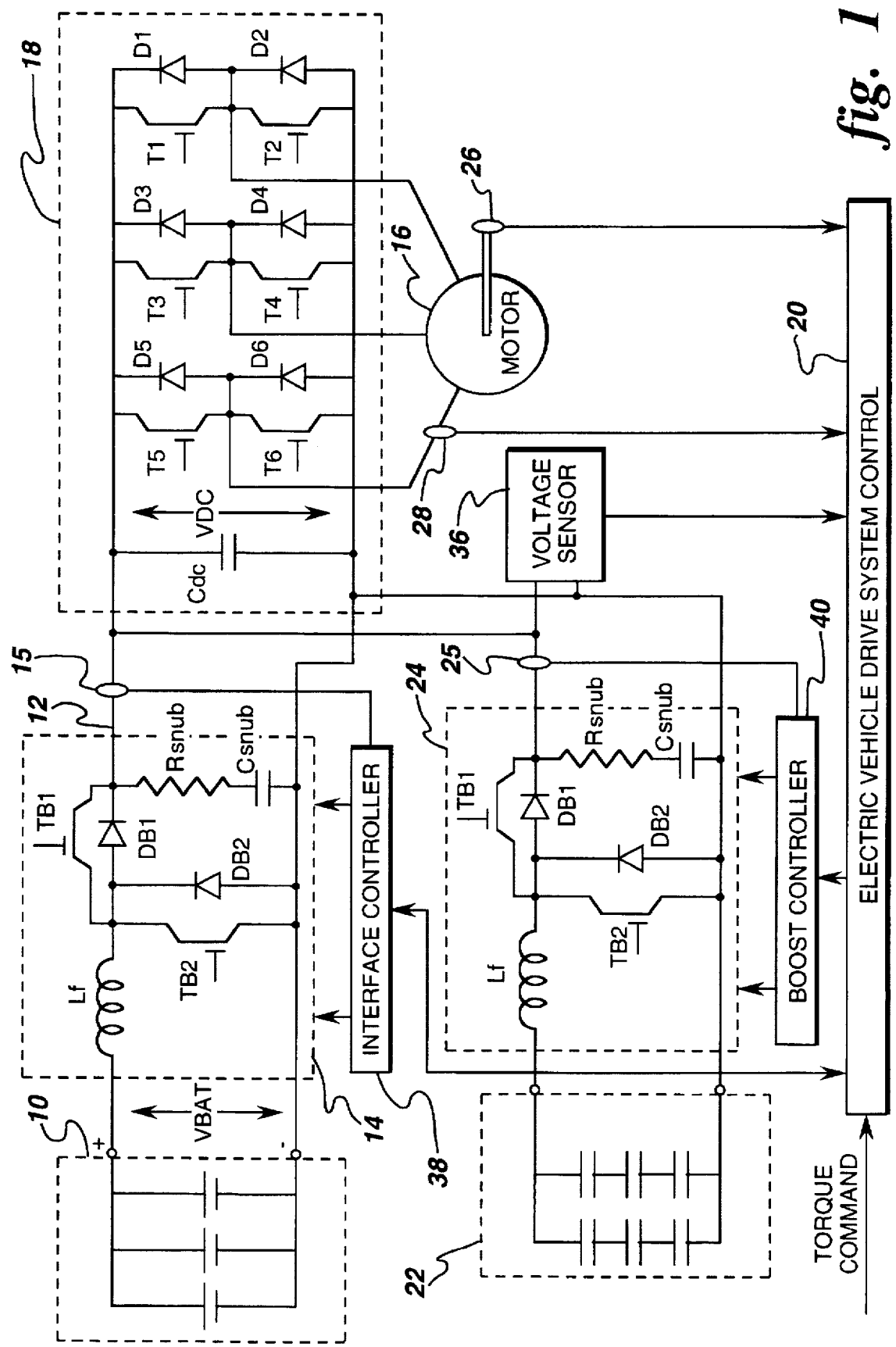
FIG. 1 schematically illustrates an electric vehicle drive system utilizing ultracapacitors and impedance matching boost converters for load leveling of a low voltage battery.

FIG. 1 illustrates an electric vehicle drive system of the type described in U.S. Pat. No. 5,373,195 which uses ultracapacitors with dynamic impedance matching boost converters to load level a low voltage battery. In the system of FIG. 1, a battery 10 is coupled to a DC link 12 by means of an interface converter 14. DC link 12 supplies power to, or receives regenerative power from, an electric motor 16 coupled to the DC link in the illustrated example by means of an inverter 18. In this example, the motor is an alternating current or AC motor requiring variable frequency excitation which is derived from the DC link by inverter 18. Motor 16 may comprise any suitable type of AC machine including, for example, an induction machine, a permanent magnet synchronous machine, an electronically commutated motor or a switched reluctance motor. An input filter capacitor Cdc is coupled across DC link 12 for filtering the voltage VDC on the link. Inverter 18 is shown as a 3-phase inverter having two series connected switching devices per phase leg, i.e., devices T1 and T2 form a first phase leg, devices T3 and T4 form a second phase leg and devices T5 and T6 form a third phase leg. Diodes D1–D6 are coupled in anti-parallel relationship across each of the switching devices T1–T6, respectively.

In a conventional manner, switching devices T1–T6 are controlled via a microprocessor-based inverter/motor controller in response to an external torque command. The motor controller may be part of the electrical vehicle drive system control 20. The instantaneous value of DC link voltage VDC is a function of battery parameters (e.g., open circuit voltage, internal resistance, state of charge, temperature) as well as motor characteristics and the magnitude and polarity of the torque command applied to electric vehicle drive system control 20. During low speed, light torque operation, inverter 18 operates in a pulse-width modulation (PWM) mode to chop the battery voltage VBAT in a manner to control current in the motor at a relatively low level. Switching losses in the inverter switching devices T1–T6 are reduced by utilizing a lower voltage battery 10 with higher current capacity coupled to DC link 12 via converter 14. An additional power source such as an auxiliary energy storage device 22 (which may comprise an ultracapacitor or magnetic energy storage device such as a superconducting magnetic energy storage device) is coupled to DC link 12 by a second interface converter 24. Interface converter 24 operates in the same manner as interface converter 14 to decouple energy storage device 22 from the DC link voltage, thereby maximizing utilization of the energy storage device. Furthermore, interface converters 14 and 24 both provide bidirectional energy conversion, allowing for transfer of regenerative energy from motor 16 to battery 10 and to energy storage device 22. An advantage of using interface converters 14 and 24 is that the voltage available from battery 10 or energy storage device 22 can be reduced and the devices replaced by devices providing a higher current density. Interface converters 14 and 24 then allow the voltage from battery 10 or energy storage device 22 to be stepped up or boosted to a higher value on DC link 12. For example, the DC link voltage may be three times the battery terminal voltage although battery current may be three times the value of the DC link current. Still further, it may be desirable to operate energy storage device 22 at a substantially higher voltage than the voltage on battery 10. If the power rating of inverter 18 is selected as a base at one per unit power, interface converter 14 may also have to be rated at the same rating in order that battery 10 can supply full power to motor 16 when energy from energy storage device 22 has been depleted. During shorter load leveling cycles, battery interface converter 14 provides about one-third of the required power of the motor whereas energy storage device 22 can supply about two-thirds of the motor peak power. In such situation, the combined installed power base for interface converter 14 and 24 is about five-thirds per unit power increasing considerably the size, weight, volume and cost of these converters.

As shown in FIG. 1, each of interface converters 14 and 24 typically comprises a DC to DC buck-boost converter (i.e., bidirectional), a well known type of converter having an input filter inductor Lf coupled in series with the parallel combination of a first switching device TB1 and an anti-parallel diode DB1. The parallel combination of a second switching device TB2 and an anti-parallel diode DB2 is coupled between the DC link negative bus and the junction of filter inductor Lf and switching device TB1. The series combination of a snubber resistor Rsnub and a snubber capacitor Csnub is coupled between the negative DC link bus and a cathode of diode DB1. More particularly, switching devices TB1 and TB2 are coupled in series, with the junction intermediate the switching devices being coupled through inductor Lf to a source of power, either the battery or energy storage device 22.

As applied to an electric vehicle drive system, control 20 receives an external torque command from an accelerator or other input device (not shown), motor speed measurements from a tachometer 26, phase current measurements from current sensors 28 and DC link voltage measurements from a voltage sensor 36. In addition, controller 20 receives a signal indicative of the status of DC to DC interface converter 14 and DC to DC interface converter 24. In particular, control 20 receives a signal indicative of the status of DC to DC converter 14 from an interface controller 38 and a signal indicative of the status of DC to DC converter 24 from a boost controller 40. Interface controller 38 and boost controller 40 are substantially the same types of control circuit and, in response to signals from current transformers 15 and 25, respectively, are utilized to provide gating signals to switching devices TB1 and TB2 in each of the respective converters 14 and 24 in order to transfer current between the DC link and the respective battery 10 or energy storage device 22. A more detailed description of interface controller 38 and boost controller 40 may be had by reference to U.S. Pat. No. 5,373,195, which patent also discloses the method of operation of interface converters 14 and 24.

In general, during driving or motoring operation of motor 16, interface converter 14 boosts the lower battery voltage VBAT to the higher DC link voltage VDC. At low speed and light torque, switches TB1 and TB2 are off such that the status of converter 14 is off and the battery voltage VBAT is applied to inverter 10 via forward biased diode DB1. For increasing speed and torque, switching devices TB1 and TB2 of converter 14 are used to boost the battery voltage, maintaining motor operation along a predetermined torque envelope. In particular, when switch TB2 is turned on, current increases in inductor Lf. After the current increases to a controlled level, switch TB2 is turned off, and the derivative of the current in inductor Lf changes sign, inducing a voltage across inductor Lf. As a result, diode DB1 becomes forward biased, increasing the DC link voltage and supplying power to the motor. When the inductor current decreases to a controlled value, switch TB2 is again turned on and the cycle repeats.

During regenerative braking, power from the high voltage DC link is converted to the battery voltage value VBAT, resulting in conventional current flow to the battery. In particular, during regenerative braking, switch TB2 is held off. Switch TB1 is turned on, causing current to increase in inductor Lf. After the inductor current has increased to a controlled level, switch TB1 is turned off, and the derivative of the current in inductor Lf changes sign, inducing a voltage across the inductor. Conventional current flows in a complete circuit from inductor Lf into the battery and back to inductor Lf through forward biased diode DB2. During the time in which TB1 is off, the DC link current charges filter capacitor Cdc. High frequency chopping is utilized in the regenerative braking mode to enable reduction in the size and weight of the passive components in converter 14 and inverter 18. Depending on battery regenerative current limits, switch TB1 could have a lower current rating than that of switch TB2.

Energy storage device 22 is illustrated as an ultracapacitor bank. System controller 20 proportions the instantaneous power between battery 10 and ultracapacitor bank 22 in response to the torque command signal. During regenerative braking, the system divides between the battery and the ultracapacitor bank the power developed by the motor so as to provide additional load leveling of the energy suplied to the battery. This technique reduces the peak power applied to the battery to a level somewhat above the average power of the drive system.

The system of FIG. 1 requires that interface converter 14 be sized to match the power rating of inverter 18 in order to allow battery 10 to supply full power to motor 16 for long periods; for example, if the motor is used in propelling an electric vehicle, such tractive power may be required on long hill climbs. For short hill climbs, more power may be drawn from ultracapacitor bank 22, generally requiring that the rating of interface converter 24 be about two-thirds the rating of inverter 18. As a consequence, power handling capacity of converter 14 and converter 24 in combination must exceed the rated power of inverter 18. Accordingly, it would be deskable to provide a system such as described above in which converters 14 and 24 can be reduced in power handling capacity to thereby allow a decrease in their size, weight, volume and cost.

Figure 2:
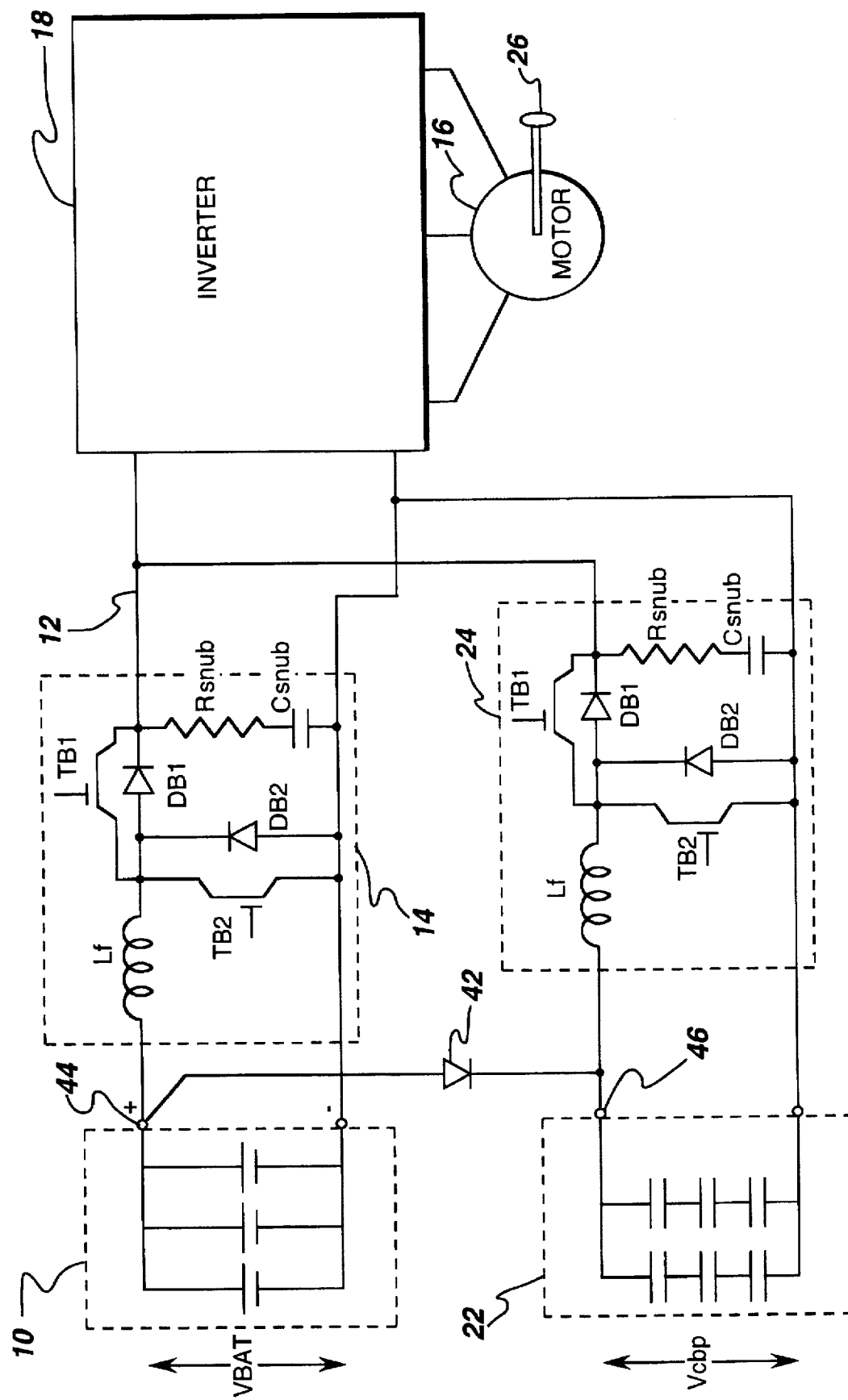
FIG. 2 schematically illustrates a modification of the system of FIG. 1 which enables reduction of the size, weight and cost of the interface circuits between the battery and DC link and the ultracapacitor bank and DC link.

An improved drive system which allows a decrease in the power handling capacity of converters 14 and 24 of the system shown in FIG. 1 is illustrated in FIG. 2. The circuitry of FIG. 2 includes an additional diode 42 coupled between the positive battery voltage terminal 44 and the positive terminal 46 of ultracapacitor bank 22. In this system, the voltage of the secondary energy storage device, i.e., ultracapacitor bank 22, is controlled above the battery voltage so that a combined one per unit power requirement can be maintained between interface converters 14 and 24. When power is being supplied to motor 16 and ultracapacitor voltage has been discharged to approximately the level of the battery voltage, diode 42 clamps the ultracapacitor voltage to the battery voltage and effectively parallel couples the 5 two interface converter circuits 14 and 24. In this mode, one per unit power can be extracted from the battery by using the parallel combination of the two converter circuits. Approximately one-third of the power can be controlled by converter circuit 14 while two-thirds of the power is controlled by converter circuit 24. Thus, the combined power handling capability of the converter circuits 14 and 24 can be limited to a one per unit value or the same equivalent value as that of inverter circuit 18. When the power flow reverses during regenerative braking, ultracapacitor bank 22 can be charged to a higher voltage at a higher rate while a maximum of one-third per unit power of the maximum inverter power can flow to the battery through converter 14. In applications where full power regenerative braking occurs over extended periods of time, the voltage on ultracapacitor bank 22 may reach its maximum allowable voltage or the DC link voltage before braking is finished. At that instant, the ultracapacitor bank interface converter 24 shuts down or stops charging ultracapacitor bank 22, thereby reducing the maximum instantaneous braking power capability to one-third per unit power. More particularly, if converter 24 is disabled, the controller limits the amount of power which can be supplied to battery 10 by restricting operation of converter 14 to its current rating, for example, one-third the rating of inverter 18. To accommodate full braking during these extended conditions, it would be necessary for battery interface converter 14 to be rated for full power, i.e., the power rating of inverter 18; however, charging battery 10 at high peak current is undesirable from a battery life perspective. Therefore, a dynamic braking resistor circuit should be coupled to the DC link to absorb excess regenerative power during an extended braking interval. Such dynamic braking circuit could include a dynamic braking resistance or braking grid coupled in series with a chopper circuit utilizing, for example, a series coupled thyristor or SCR. The chopper circuit is not bidirectional and is substantially less costly than the interface converter electronics.

Figure 3:
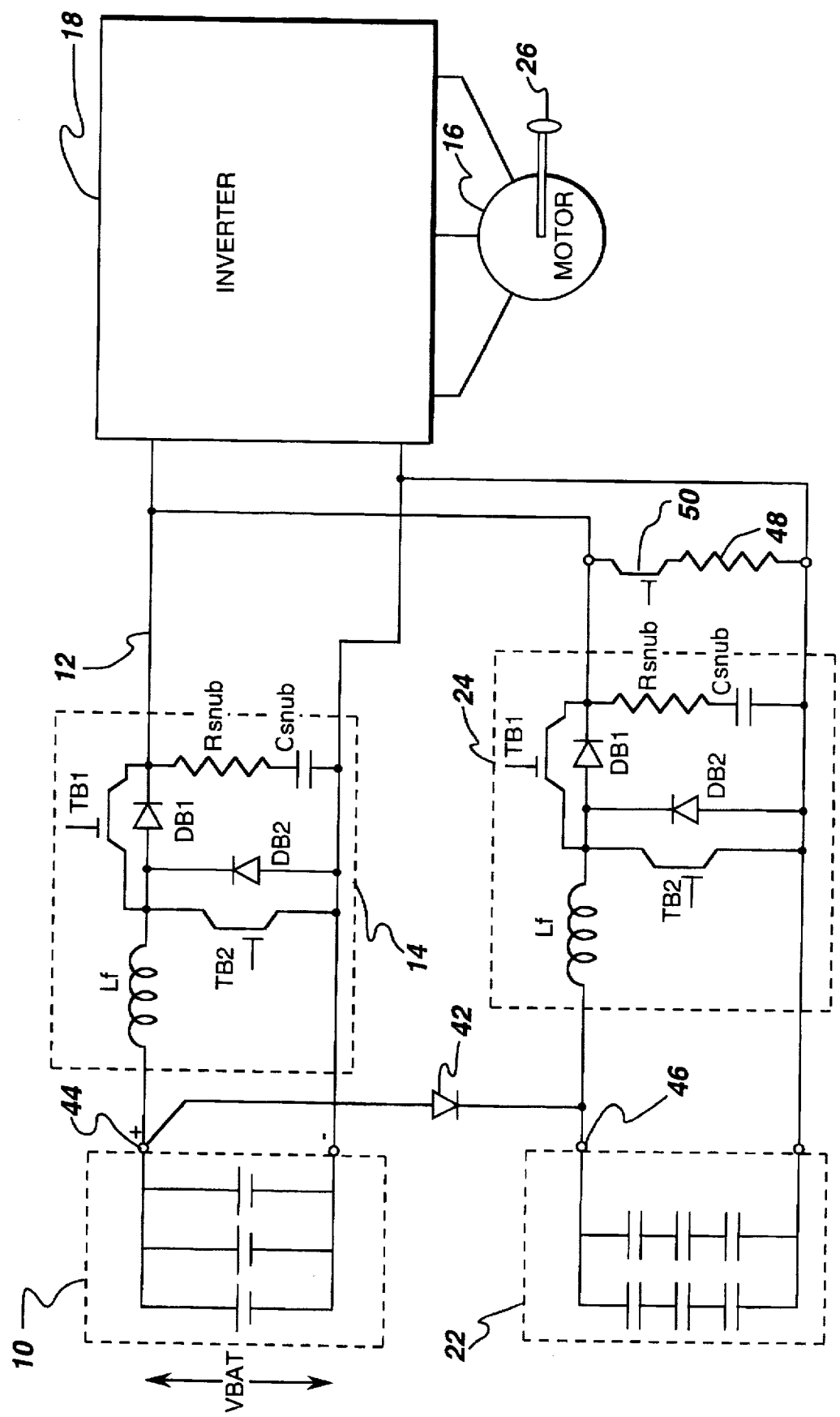
FIG. 3 schematically illustrates the system of FIG. 2 modified to incorporate electrical dynamic braking.

FIG. 3 illustrates a modification of the circuit of FIG. 2, capable of extended electrical braking utilizing the above-mentioned dynamic braking circuit. In the embodiment of FIG. 3, the dynamic braking circuit comprises a braking resistance 48 serially coupled with an electronic switching device 50, the series combination being coupled across DC link 12. Operation of switching device 50 is controlled by system controller 20 in response to detection of electrical braking and a shutdown of converter circuit 24. Dynamic braking resistance 48 is preferably sized to two-thirds the rated power of inverter 18 so that during full regenerative braking, resistance 48 can absorb two-thirds of the available regenerative power while one-third of the power is still being applied to battery 10. Electronic switching device 50 may comprise the same type of device as used for devices TB1 and TB2 in converter circuit 24; however, even further cost reduction can be achieved if device 50 is replaced by a low cost thyristor or SCR.

Figure 4:
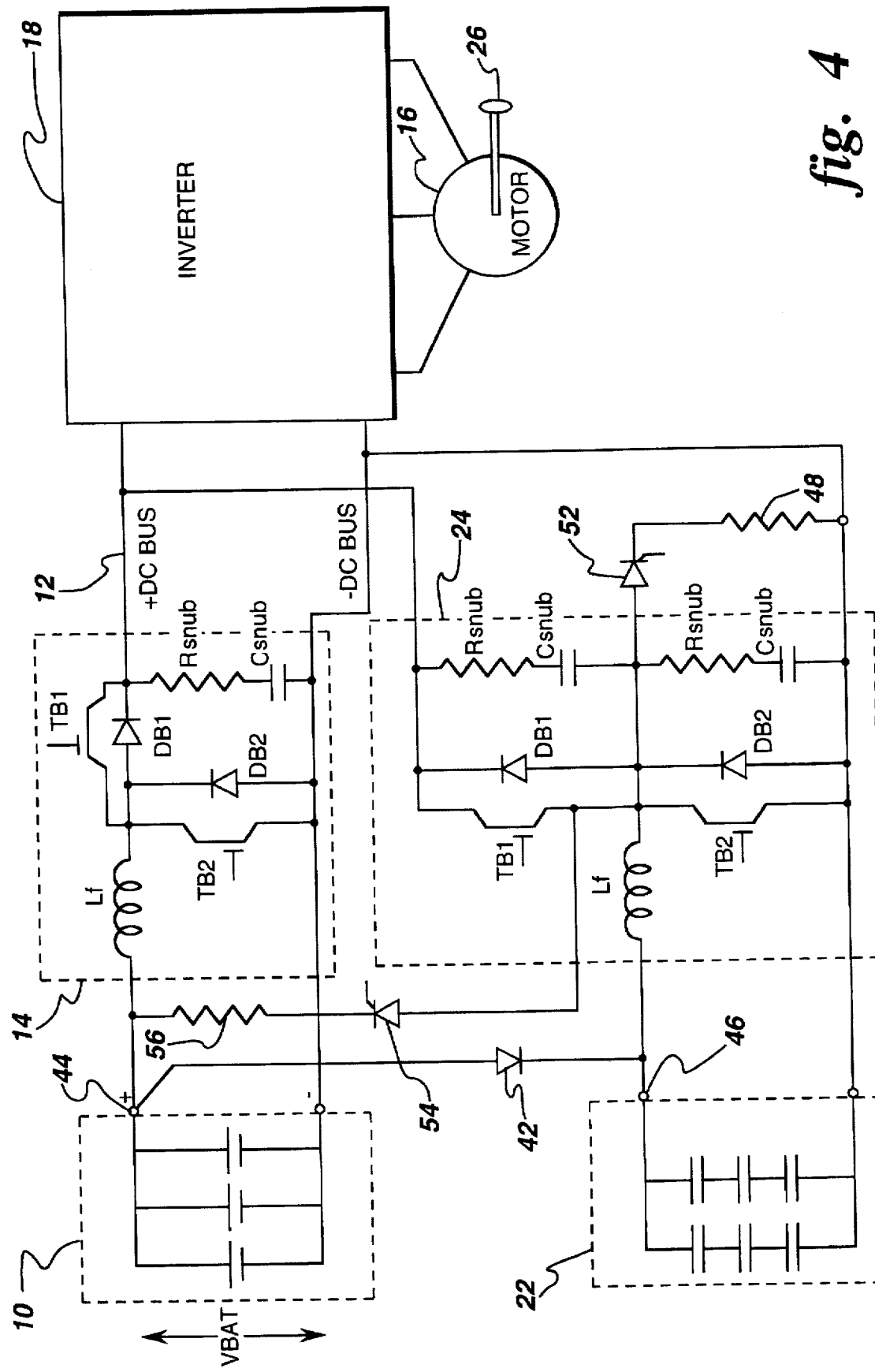
FIG. 4 schematically illustrates a modification of the system of FIG. 3 enabling use of thyristors for switching devices in the dynamic braking circuits.

FIG. 4 illustrates a modification of the circuit of FIG. 3 in which the dynamic braking circuit is coupled between a junction intermediate switching devices TB1 and TB2 of converter circuit 14 and the negative DC bus on DC link 12. In this embodiment, switching device 52 is an SCR which can be gated into conduction and, once conducting, remains in conduction until current in the device has been reduced to substantially zero by reverse biasing the anode-cathode junction. This can be achieved in the illustrative embodiment by switching device TB2 into conduction to thereby connect the anode terminal of the SCR to the negative DC bus. FIG. 4 also shows a second dynamic braking circuit connected between positive battery terminal 44 and the junction intermediate switching devices TB1 and TB2 in converter 24. In this second dynamic braking circuit, a switching thyristor or SCR 54 is poled to conduct conventional current from converter 24 to positive battery terminal 44. This additional dynamic braking circuit allows power to be dissipated in a second dynamic braking resistance 56 while at the same time providing boost charging to battery 10. Both SCR's 52 and 54 can be turned off by switching device TB2 in converter 24 into a conducting mode to connect the anodes of each of the thyristors to the negative DC bus. SCRs 52 and 54 can be triggered every switching cycle of interface converter 24 to modulate the power dissipated in resistances 48 and 56 in a manner to regulate the DC link voltage.

Figure 5:
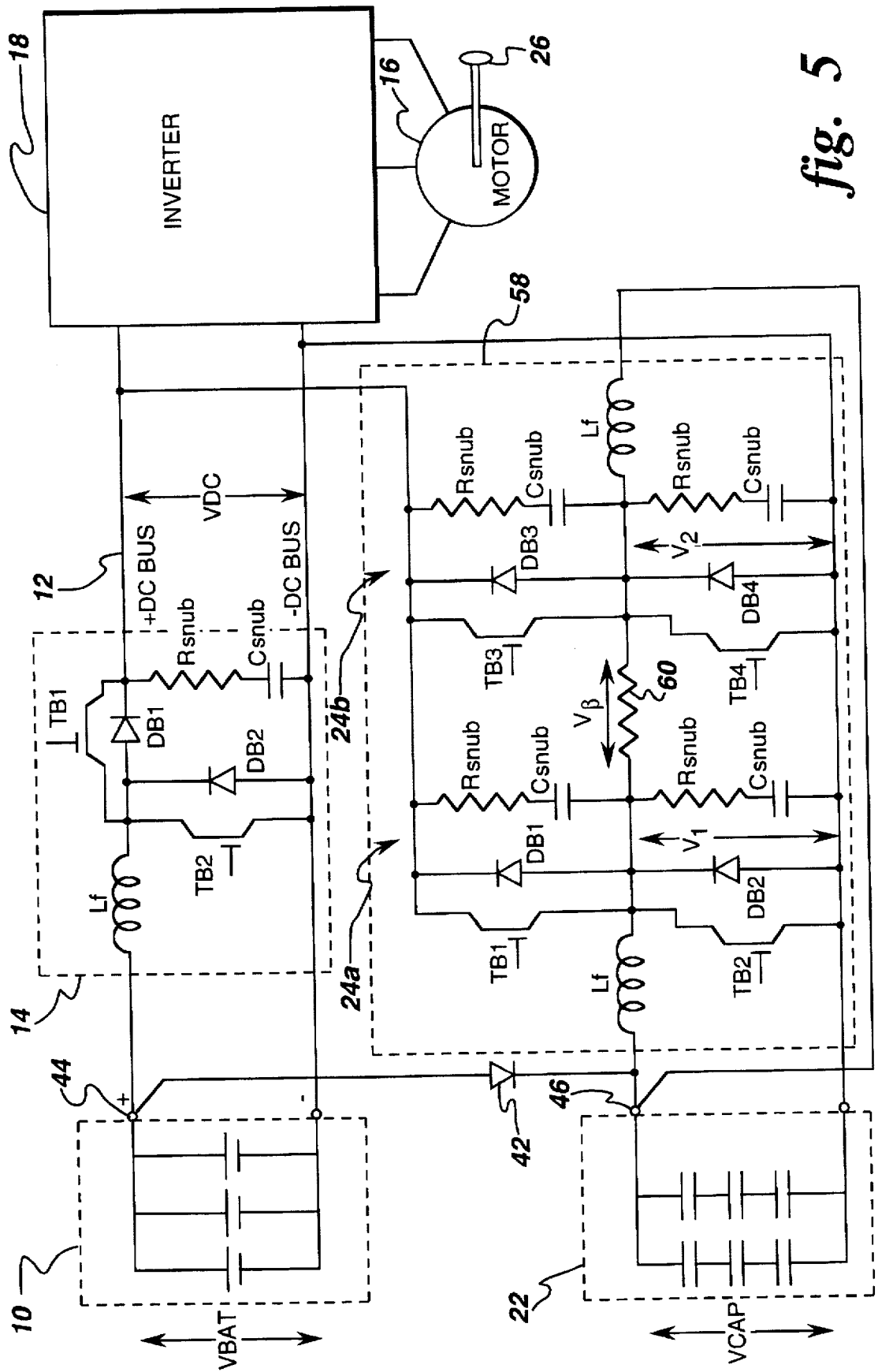
FIG. 5 schematically illustrates a further modification of the system of FIG. 4 utilizing a modular interface converter circuit.

FIG. 5 illustrates another embodiment of the invention in which ultracapacitor bank or energy storage device 22 is coupled to the DC link 12 by an interface circuit 58 comprising a pair of parallel coupled converters 24a and 24b, each of which is identical to converter 24 in circuit configuration but reduced in size and power rating to correspond to converter 14. The advantage of this particular combination is that interface circuits 24a, 24b and converter 14 may be identical and sized identically, enabling a modular approach to construction of the system. If each of the interface circuits is rated for one-third per unit power of the total required volt amp switch rating of inverter 18, the combined power (VA) rating of the three modular circuits equals the total power rating of inverter 18.

A dynamic braking resistance 60 is coupled between the two phase legs of converters 24a and 24b. During normal operation, devices TB1 and TB2 in converter 24a and devices TB3 and TB4 in converter 24b are switched at the same instants so that the effective voltage drop across resistance 60 is zero and no current flows through the resistance. Whenever dynamic braking is required, i.e., when ultracapacitor bank 22 has been fully charged, the switching instants of phase legs 24a and 24b are shifted (over an angle β) to produce a controllable voltage across resistance 60. This allows the power dissipated in braking resistance 60 to be controlled independently from the power delivered to ultracapacitor bank 22. The duty cycles of phase legs 24a and 24b are determined by the maximum DC link voltage and the maximum voltage on ultracapacitor bank 22 wherein the duty cycle δ is equal to Vcap/Vdc. The DC link voltage can be increased during dynamic braking to the maximum allowable DC link voltage, i.e., the maximum voltage rating of DC link capacitor Cdc, e.g., 450 VDC.

Figure 6A:
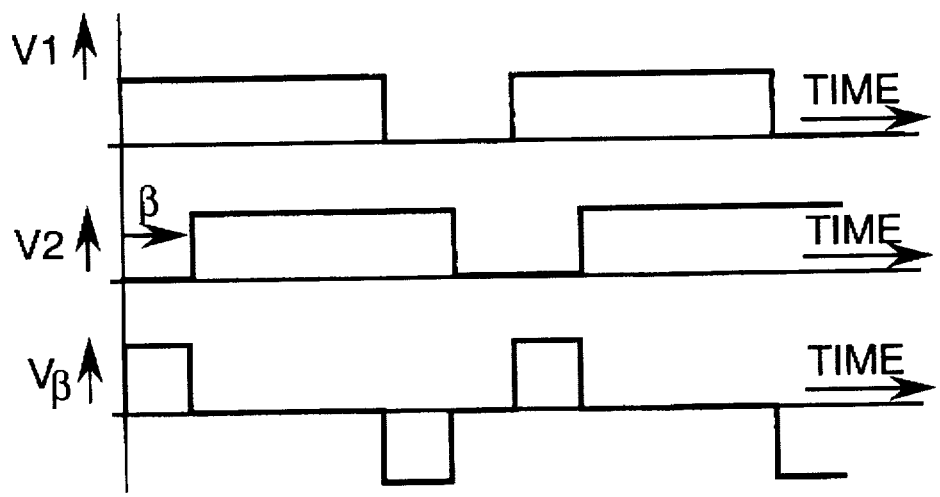
FIGS. 6A and 6B graphically illustrate switching waveforms for the modular converter circuits of FIG. 5.
Figure 6B:
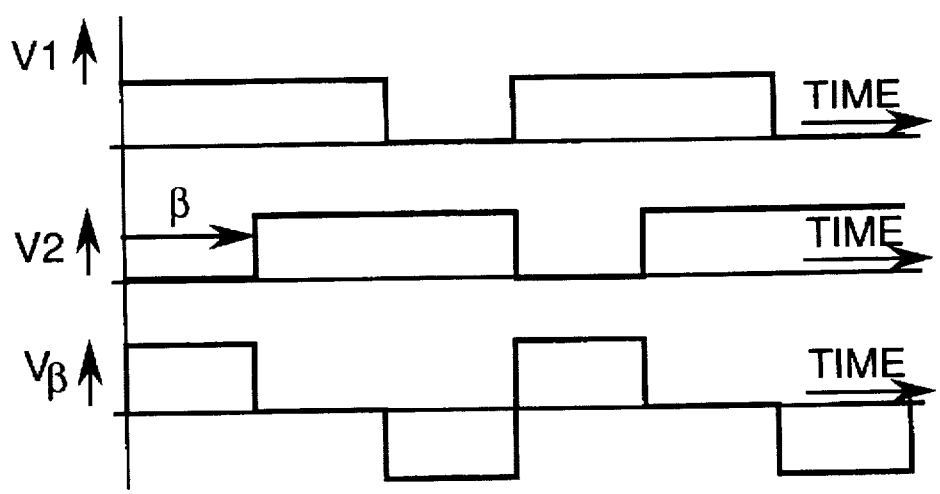

FIGS. 6A and 6B illustrate switching waveforms for the converter circuits of FIG. 5 when the rated DC link voltage is 300 volts and the maximum allowable voltage on ultracapacitor bank 22 is 300 volts. FIG. 6A shows a limited phase shift where V1 and V2 are the voltages across switch devices TB2 and TB4, respectively, and Vβ is the voltage across resistance 60. FIG. 6B shows a maximum phase shift with two-thirds of the regenerative power transferred to resistance 60. The duty cycle of phase legs 24a and 24b is δ=⅔ and a maximum phase shift of 60° can be realized, producing a maximum RMS voltage of 364 volts across resistance 60, which equals the voltage rating of ultracapacitor bank 22. Given that each converter section 24a and 24b is rated for one-third per unit power, the maximum power that can be dissipated by resistance 60 under the assumed conditions exceeds the power rating of the interface circuit comprising converters 24a and 24b. More particularly, the power that can be dissipated in resistance 60 exceeds the rating of two-thirds per unit power. A disadvantage of this approach is that in normal operation, both converters 24a and 24b must switch at the same instant to prevent losses in braking resistance 60. Consequently, this approach does not allow the DC link current to be minimized by shifting phase of converters 24a and 24b. The approach of FIG. 5 may in fact increase the ripple current on DC link capacitor Cdc.

Figure 7:
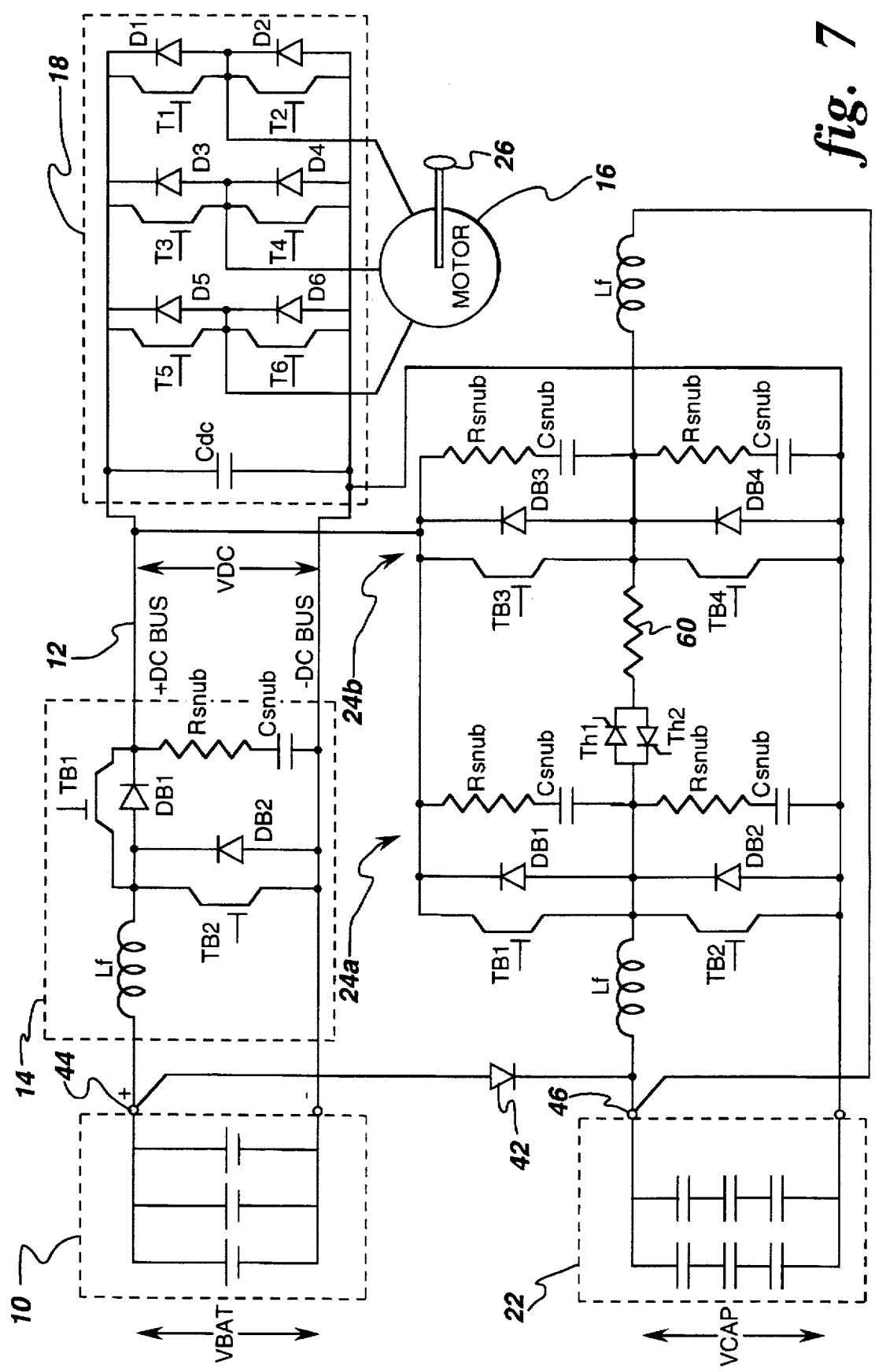
FIG. 7 schematically illustrates a further modification of the system of FIG. 5 which minimizes ripple current on the DC link.

An alternative embodiment, shown in FIG. 7, allows continuous phase shift operation of both converter phase legs 24a and 24b so as to minimize DC link ripple currents. In this embodiment, parallel opposed thyristors Th1 and Th2 are coupled in series circuit with resistance 60 and are independently controlled so as to control current through resistance 60. By firing thyristors Th1 and Th2 between the switching instants of the phase legs, the current in the resistance caused by phase shifting the switching of the two converter circuits 24a and 24b can be controlled. Thyristors Th1 and Th2 are automatically switched off by operation of switching devices TB2 and TB4 in each of the phase legs every half cycle during normal operation.

While the invention has been described in what is presently considered to be a preferred embodiment, many variations and modifications will become apparent to those skilled in the art. For example, while the invention is disclosed in an embodiment applicable to an electric motor drive system, the invention is also applicable to other forms of pulsed load systems, i.e., systems in which auxiliary power is intermittently required from a passive storage device. Such use may occur, for example, in a battery powered laser system in which stored energy is required to strobe the laser. Accordingly, it is intended that the invention not be limited to the specific illustrative embodiment but be interpreted within the full spirit and scope of the appended claims.

What is claimed is:

1. A battery load leveling arrangement for an electrically powered system in which battery loading is subject to intermittent high current loading, the system including a battery coupled to supply electric power to a DC link, a load, and a system controller coupled in circuit between the DC link and load for controlling application of power to the load, said battery load leveling arrangement comprising:

a passive energy storage device;

a first bidirectional converter coupled in circuit with the passive energy storage device and the DC link for transferring electrical power between the DC link and the energy storage device;

a second bidirectional converter coupled in circuit between the battery and the DC link for transferring electrical power between the battery and DC link; and unidirectional conducting means coupling the battery to the energy storage device and poled to conduct conventional current from the battery to the energy storage device whereby battery current can be coupled to the DC link through each of the first and second converters when battery terminal voltage is greater than voltage on said passive energy storage device by an amount at least equal to a voltage drop across said unidirectional conducting means.

2. The battery load leveling arrangement of claim 1 including an electrical resistance circuit coupled to said first bidirectional converter and adapted to dissipate regenerative electric power when said passive energy storage device is fully charged.

3. The battery load leveling arrangement of claim 2 wherein said first bidirectional converter comprises a pair of switching devices serially coupled between a relatively positive and a relatively negative terminal of the DC link, said electrical resistance circuit being coupled between the relatively negative terminal and a junction intermediate the pair of serially coupled switching devices.

4. The battery load leveling arrangement of claim 3 wherein said electrical resistance circuit comprises a thyristor and a dynamic braking resistance coupled in series circuit with said thyristor.

5. The battery load leveling arrangement of claim 4 including a second thyristor and a second dynamic braking resistance coupled in series circuit with said second thyristor between a relatively positive terminal of the battery and said junction intermediate said pair of serially coupled switching devices.

6. The battery load leveling arrangement of claim 2 wherein said first bidirectional converter comprises a pair of parallel coupled converters each substantially identical to said second bidirectional converter and each having a pair of switching devices serially coupled between a relatively positive and a relatively negative terminal of the DC link, said electrical resistance circuit comprising an electrical resistance coupled between junctions intermediate said pair of switching devices of each of said pair of parallel coupled converters.

7. The battery load leveling arrangement of claim 6 including an electronic switching device coupled in series circuit with said electrical resistance.

8. The battery load leveling arrangement of claim 7 wherein said electronic switching device comprises a pair of thyristors coupled in parallel opposition.

9. The battery load leveling arrangement of claim 6 wherein the load comprises an electric motor operable in a propulsion mode and a regenerative braking mode, and a controller responsive to voltage on said energy storage device and on said DC link for controlling operation of said parallel coupled converters by varying switching instants thereof so as to establish a voltage across said electrical resistance and a current therein when the motor is operated in a regenerative braking mode so as to dissipate regenerative electrical power in said resistance.

10. The battery load leveling arrangement of claim 1 wherein the first bidirectional converter is constructed with a power rating twice the power rating of the second bidirectional converter.

11. The battery load leveling arrangement of claim 2 wherein said resistance circuit comprises an electrical resistance serially coupled to an electronic switching device, said switching device and said resistance being coupled in parallel circuit with said first bidirectional converter.

12. The battery load leveling arrangement of claim 11 wherein said switching device comprises a unidirectional chopper.

13. The battery load leveling arrangement of claim 1 wherein said energy storage device comprises an ultracapacitor bank.

14. A method for load leveling of a battery in an electric motor drive system including a power regulator coupled to transfer power between a motor and a DC link, comprising the steps of:

supplying current to the DC link from the battery through first and second DC-to-DC converters, said converters each having a respective predetermined power handling capacity, whenever battery voltage exceeds a predetermined level of voltage on a passive energy storage device; and operating a dynamic braking circuit when the motor is operated in a regenerative mode and the passive energy storage device is fully charged, to dissipate regenerative power in excess of the power handling capacity of the first converter.

15. The method of claim 14 wherein the first converter comprises a pair of independently controllable DC-to-DC converters coupled in parallel to the DC link, the dynamic braking circuit being coupled in circuit between the pair of converters, and wherein the step of operating the dynamic braking circuit includes the step of varying operating times of the pair of independently controllable DC-to-DC converters with respect to each other so as to control an amount of power dissipated in the dynamic braking circuit.

* * * * *